Aug. 8, 1967   E A. SMART ETAL   3,335,262
ELECTRIC WARMING TRAY
Filed April 24, 1964   2 Sheets-Sheet 1
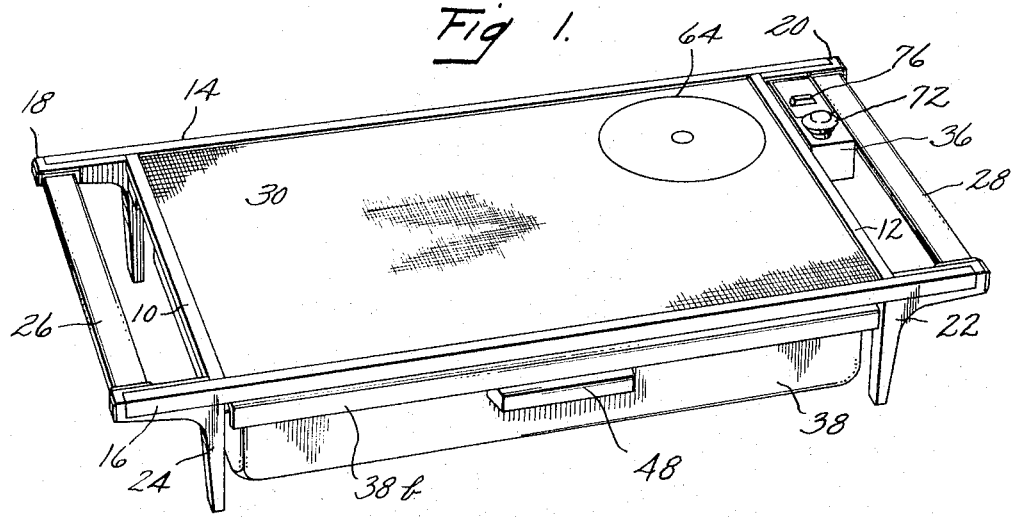
Fig. 1.
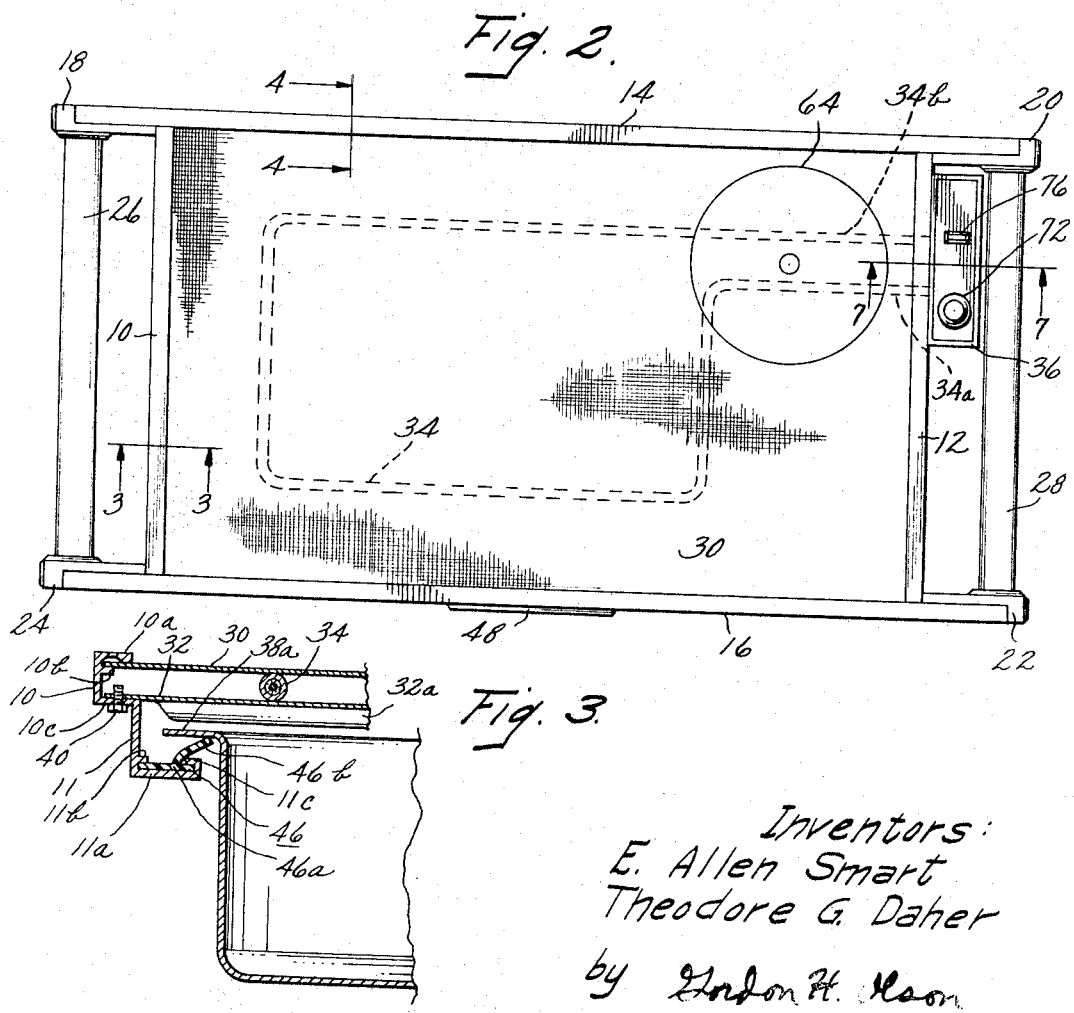
Fig. 2.
Fig. 3.
Inventors:
E. Allen Smart
Theodore G. Daher
by Gordon H. Moon
Their Attorney

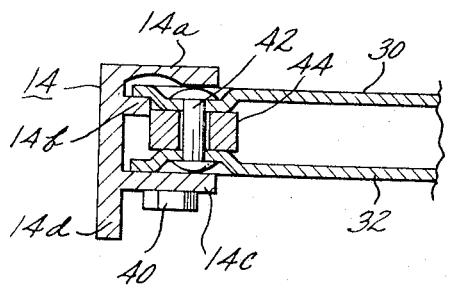
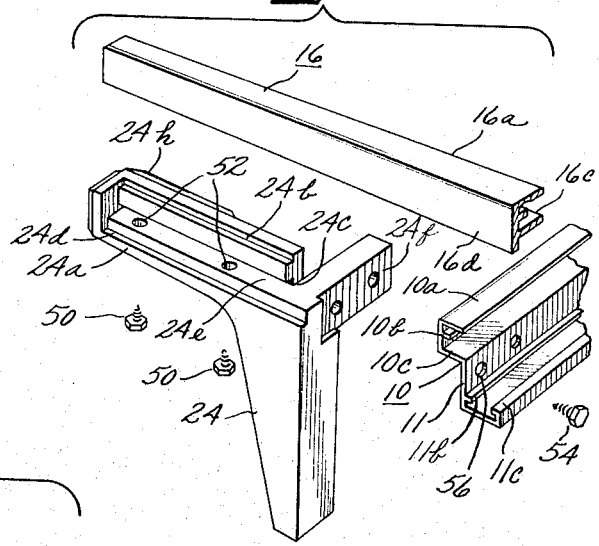
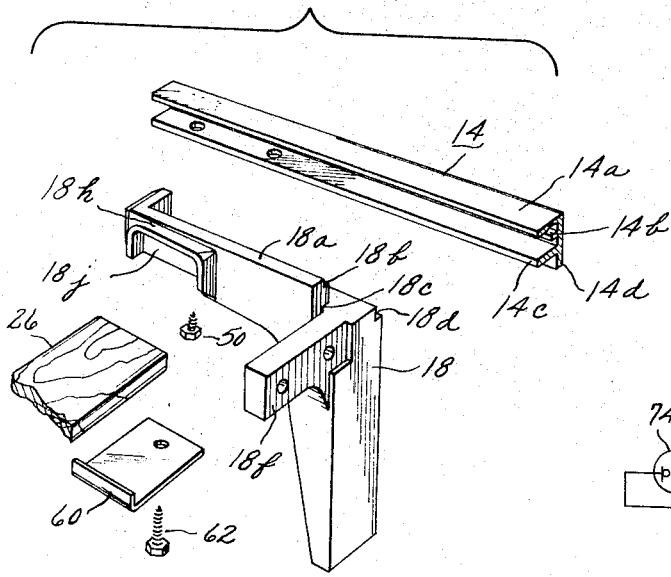
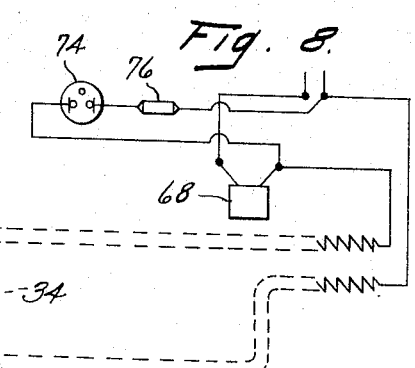
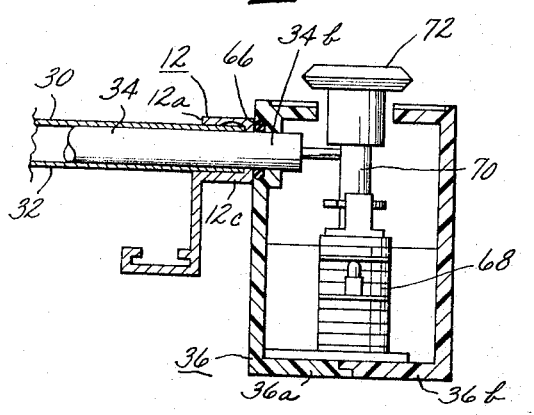

United States Patent Office 3,335,262
Patented Aug. 8, 1967

3,335,262
ELECTRIC WARMING TRAY
E Allen Smart, Trumbull, and Theodore G. Daher, Stratford, Conn., assignors to General Electric Company, a corporation of New York
Filed Apr. 24, 1964, Ser. No. 362,266
8 Claims. (Cl. 219—474)

This invention relates to an improved electric warming tray which is particularly useful for keeping food and other items warm once they have been removed from a stove or other cooking unit.

To fully appreciate the taste of those foods which are to be eaten warm, it is important that they be kept at the proper temperature when in the serving area. Hence, electric warming trays to perform such a function have become a valuable addition to the electric appliance line. A device of this nature is especially convenient when entertaining large groups of people, such as at a dinner, buffet, or party.

It is a primary object of this invention to provide a versatile low cost electric warming tray which is adapted to heat items situated above and below a source of heat, and which has a strong, lightweight, rugged construction.

It is another object of this invention to provide an improved electric warming tray having a uniquely arranged and constructed heating means and warming drawer.

In accordance with one aspect of this invention, the electric warming tray includes a pair of thin, flat, metal panels supported in horizontal spaced relation. An electric heater of the type including a metal sheath and a resistance heating element insulated therein is positioned between and in heat transfer relation with the panels. Serving dishes containing food may be placed directly on the upper panel to be kept at a desired serving temperature. With the heater and panel arrangement described, heat is radiated both upwardly and downwardly, so that a warming drawer may be slidably mounted beneath the lower panel to receive radiant heat from the heater as transmitted through the lower panel. Thus, additional food, such as rolls or other items, may be placed within the drawer to increase the versatility of the appliance. The drawer and the heating assembly are supported in a manner to provide a lightweight, strong construction.

Further features, objects and advantages will become apparent with reference to the following drawings in which:

FIG. 1 is a perspective view of the electric warming tray of the invention;

FIG. 2 is a top plan view of the tray;

FIG. 3 is a cross-sectional view of a portion of the tray on line 3—3 of FIG. 2;

FIG. 4 is a cross-sectional view of a portion of the tray on line 4—4 of FIG. 2;

FIG. 5 is an exploded perspective view of the tray corner construction including a leg and associated supports;

FIG. 6 is an exploded perspective view showing the tray corner construction at an angle to also show the handle;

FIG. 7 is a cross-sectional view of the tray on line 7—7 of FIG. 2 and

FIG. 8 is a schematic diagram of the tray electrical circuitry.

Referring now to the drawings, the electric warming tray of the invention may be seen as including a pair of side supports 10 and 12, a rear support 14, a front support 16, a plurality of legs 18, 20, 22 and 24, and a pair of handles 26 and 28 each extending between a respective pair of legs. The tray further includes an upper metal panel 30, a lower metal panel 32, an electric heater 34 sandwiched between the two panels, and a housing 36 containing the electrical controls for the heater 34. A unique warming drawer 38 is slidably mounted beneath the lower panel 32 to receive radiant heat from the heater as transmitted through the lower panel.

Consider now each of the above mentioned major elements of the warming tray in greater detail to obtain a further appreciation of the improved simplified construction of the invention. From the cross-sectional view of FIG. 3, it can be seen that the side support 10 is a channel-shaped, easily extruded member formed with a plurality of inwardly extending flanges including an upper flange 10a, a shorter flange 10b spaced slightly beneath flange 10a, and a lower flange 10c. When the tray is assembled, upper metal panel 30 is supported between flanges 10a and 10b, and lower metal panel 32 rests upon lower flange 10c. Further, panel 32 is secured to flange 10c by a plurality of threaded fasteners, one of which is shown at 40 in FIG. 3. It will be understood that side support 12 naturally has a cross-section similar to that for side support 10 and that the panels 30 and 32 are similarly supported on that side of the tray.

It can be seen from FIG. 4 that rear support 14 is similarly provided with inwardly extending parallel flanges 14a, 14b and 14c. Further, the metal panels 30 and 32 are secured to rear support 14 in the same manner that they are secured to the side flanges 10 and 12. Naturally, front support 16 is identical in cross-section to rear support 14. All of the supports are preferably formed of aluminum or similar strong, lightweight material.

Prior to being assembled to the channel-shaped support members, the panels 30 and 32 and the heater 34 are connected to form a separate sub-assembly. The heater 34 is of the well-known sheathed type including an inner resistance heating element surrounded by a suitable heat conducting electrically insulating material which is in turn confined within a metal sheath. As can be seen from FIG. 2, the heater 34 is arranged in a somewhat rectangular pattern and sandwiched between panels 30 and 32. The heater is clamped in this position and the panels are securely joined by means of a plurality of rivets 42, as seen in FIG. 4, extending through the panels. The heads of the rivets are positioned in dimpled recesses formed in the panels and a washer 44 surrounding the rivet 42 maintains the proper spacing between the edges of the panels. Note that the head of rivet 42 is concealed beneath support flange 14a.

To provide the necessary strength and heat conducting characteristics the upper panel 30 is preferably formed of aluminum or porcelainized steel, while the lower panel 32 is preferably made of aluminumized steel. To improve the strength and integrity of the structure, lower panel 32 is formed with a pattern of depressions which may be partially seen at 32a in FIG. 3.

With the simple and inexpensive heater and panel construction shown, heat is naturally given off both upwardly and downwardly. To take advantage of the downwardly directed heat, and to eliminate the need for adding costly insulation preventing the transfer of heat downwardly, the unique warming drawer 38 is provided. This drawer has a simple open top construction formed from an aluminum stamping. It is very convenient for warming rolls or similar foods while the upper surface of the tray is free to heat other items. The drawer 38 is provided with a pair of outwardly extending flanges 38a, in FIG. 3, by which the drawer may be slidably supported from the side supports 10 and 12.

More specifically, each side support 10 and 12 is formed integrally with an L-shaped member including a depending side wall 11 which extends downwardly from the inner edge of flange 10c and an additional supporting flange 11a extending inwardly from the lower edge of side wall 11. The side wall 11 and flange 11a are further provided with projections 11b and 11c which define a groove or slot adapted to receive the bottom wall 46a of a guide or slide 46. The guide 46 further includes an upwardly and inwardly extending wall 46b which directly supports flange 38a of the drawer 38. The guide is preferably formed of polypropylene, nylon or similar material which is flexible, long wearing, quiet when rubbed against metal and produces a minimum of friction with a metal surface.

As can be seen from FIG. 1, the front, upper edge of the drawer 38 presents a smoothly rounded depending lip 38b. The front end of the guide 46 protrudes slightly beyond the front edge of flange 11a to contact the inner edge of drawer lip 38b when the drawer is pushed inwardly. Such an arrangement provides a quiet stop for limiting the inward movement of the drawer. For convenience in moving the drawer, there is provided an insulated handle 48.

As can be seen from the drawing, the support members surrounding the metal panels are supported and spaced from a table or other supporting surface by means of the four legs 18, 20, 22 and 24. These legs are molded of plastic or similar insulating material and are uniquely formed with suitable recesses for receiving the side and end supports and the handle. Leg 24, which is identical to leg 20, is shown in greater detail in FIG. 5. Legs 18 and 22 are mirror images of legs 20 and 24. The leg is formed with a horizontally extending portion 24a having an elongated recess which is grooved to cooperate with the flanges formed on the front of support 16, such that the assembled construction presents a smooth, somewhat rectangular exterior, as seen in FIGS. 1 and 2. Specifically, the inner edge of flange 16a is received within recess 24b, the inner edge of flange 16c is received within groove 24c, and the lower surface of flange 16c rests on leg surface 24e. The lower edge 16d of support 16 fits within lower recess 24d of the leg 24. Support 16 is secured in this position by means of a pair of fastening members 50 extending through a pair of apertures 52 in leg 24 and threadedly received in support 16.

Side support 10 is supported in the same plane with front support 16 by means of horizontally extending leg portion 24f, which is perpendicular to portion 24a. As can be seen from FIG. 5, the bottom surface of flange 10c is adapted to be received on the upper surface of portion 24f. The outer surface of side wall 11 is received against the inner recessed surface of portion 24f; and support 10 is secured in this position by means of a pair of threaded fasteners, one of which is shown at 54 extending through aperture 56 in side wall 11 and threadedly received in portion 24f.

An exploded view of leg 18 as viewed from the front of the warming tray is shown in FIG. 6 to further illustrate the leg and handle construction. The portions of leg 18 which are similar to those described in connection with leg 24 is FIG. 5 are similarly numbered on FIG. 6 to indicate their cooperation with rear support 14. In FIG. 6, the inner or handle side of horizontally extending portions 18a can be seen. A U-shaped inwardly extending projection 18h defines a recess 18j adapted to receive one end of handle 26. The recess is open on its lower side so that the handle may be easily installed. The handle 26 is secured in recess 18 by means of a suitably formed clamp 60 and a threaded fastening member 62 which extends through the clamp and is threaded into the lower surface of leg portion 18a.

Some of the advantages of the foregoing described leg and associated support construction are that the structure is light in weight, but it is extremely strong. By having the front and rear supports 14 and 16 extend beyond the ends of the side supports 10 and 12 and cooperate with the outwardly extending horizontal leg portions, such as 18a and 24a, the front and rear supports re-enforce the plastic legs. Also, by attaching front and rear supports in this fashion, the area between legs 24 and 22, and between legs 18 and 20, is completely open to accommodate the warming drawer 38. Moreover, with such construction, the outwardly, horizontally extending portions 18a and 24a of the legs are conveniently utilized for supporting the handle 26 in parallel spaced relation with respect to support 10.

Referring once more to FIG. 2, it may be seen that the end portions of the heater 34 extend in closely spaced parallel relation for a distance approximately the length of the diameter of the circle 64 shown on the upper panel 30. By arranging the end portions so closely together, the heat given off by heater 34 is somewhat concentrated in the area outlined by the circle. Hence, this area or spot of the panel surface is raised to a higher temperature than the surrounding area. This is particularly convenient for placing a certain item on the tray which might require a higher temperature than most items; for example, a pot of coffee can be conveniently placed on the higher temperature zone.

As can be seen from FIGS. 2 and 7, terminals 34a and 34b of the heater extend through openings formed in side support 12 and into a plastic housing 36. While the housing 36 is not completely liquid sealed, it is very important that the housing be sealed from the upper panel 30 and side support 12 so that if liquids are spilled on the surface of the tray, they will not be able to flow into contact with the electric terminals within the housing 36. Hence, there is provided an annular seal 66 which surrounds the heater end portions 34a and 34b. The seal 66 is received within a mating recess in the side wall of the housing; and when the side wall of the housing is secured to the side support 12 by suitable fastening means (not shown), the seal is compressed against the mating parts to prevent the seepage of liquid into the housing.

As seen from FIG. 7, the housing 36 is formed of two plastic halves 36a and 36b which are clamped together in some suitable fashion. Within the housing 36 there is provided a combined switch and thermostat 68 controlled by a suitable adjustable shaft 70 and control knob 72. Since the particular switch and thermostat form no part of the invention the details are not fully described. A removable power cord (not shown) plugs into the rear of the housing.

As seen in FIG. 8, the heater 34 is connected in series with the switch thermostat 68 and connected to a suitable source of AC power. A neon lamp 74 and current limiting resistor 76 are connected in parallel with the heater 34 to indicate when the heater is energized. The lamp 74 and the control knob 72 are both conveniently accessible from the top surface of the tray as seen in FIGS. 1 and 2.

From the foregoing, it can be seen that an improved electric warming tray has been described which constitutes a valuable contribution to the art. Some of the salient features of this invention are the strucural simplicity, strength of construction, and the versatility provided by the warming drawer.

While a particular embodiment of the invention is disclosed, the invention is not limited to the specific construction described, and it is intended by the appended claims to cover all modifications and applications that fall within the true spirit and scope of the invention.

What is claimed as new and desired to be secured by Letters Patent of the United States is:

1. An electric warming tray comprising: an upper and a lower thin, flat metal panel; an electric heater of the type including a metal sheath and an insulated resistance heating element therein positioned between said panels; means clamping the panels together about said electric heater and form an assembly wherein the panels are disposed in a spaced, parallel arrangement; means supporting the assembly above a supporting surface; and a warming drawer slidably carried by said supporting means below said lower panel to receive radiant heat therefrom.

2. The electric warming tray of claim 1, wherein the heater includes two portions which are closely arranged to each other so that the area of said panels adjacent to said portions is heated to a temperature level significantly higher than the remaining surface area of said panels.

3. The electric warming tray of claim 1, wherein the supporting means comprise a pair of elongated end supports and a pair of side supports, each support having a plurality of flanges thereon which engage the edges of said panels to form a rigid structure therewith.

4. The electric warming tray of claim 3, wherein the supporting means also include a plurality of legs, each leg being attached to a side support and an end support.

5. The electric warming tray of claim 4, wherein a pair of insulated handles extend between and are attached to said elongated end supports.

6. The electric warming tray of claim 4, wherein the clamping means include a plurality of fastening members which clamp the peripheral portions of said panels to hold the said electric heater in heat transfer relation with the panels.

7. The electric warming tray of claim 3, wherein each of said supports includes three inwardly extending flanges arranged in a spaced, parallel relation, the upper pair of flanges on each of said supports engaging the edges of said upper panel, and the lowest of said flanges on each of said supports carrying the lower panel.

8. The electric warming tray of claim 7, wherein each of said side supports also includes a wall depending from the lowest of said three flanges, and a fourth flange extending inwardly from each of said walls to thereby support said warming drawer.

References Cited
UNITED STATES PATENTS

| | | | |
|---|---|---|---|
| 1,594,320 | 7/1926 | Nessif | 219—472 X |
| 1,751,219 | 3/1930 | Seamon | 219—474 |
| 1,959,198 | 5/1934 | Conry | 219—443 X |
| 2,011,035 | 8/1935 | Collat et al. | 219—478 |
| 2,059,133 | 10/1936 | Merritt | 219—474 X |
| 2,291,857 | 8/1942 | Woodman | 219—474 X |
| 2,432,800 | 12/1947 | Reichold | 219—553 X |
| 2,764,080 | 9/1956 | Knapp | 99—339 |
| 2,907,862 | 10/1959 | Huck | 99—339 X |
| 3,231,718 | 1/1966 | Vasile | 219—465 |

RICHARD M. WOOD, *Primary Examiner.*

C. L. ALBRITTON, *Assistant Examiner.*